United States Patent
Avivi et al.

[11] 3,713,043
[45] Jan. 23, 1973

[54] GAS LASERS WITH ELECTRICALLY-CONDUCTIVE PLASMA TUBE

[75] Inventors: Pinchas Avivi; Felix Dothan, both of Jerusalem, Israel

[73] Assignee: Yissum Research Development Company of the Hebrew University, Jerusalem, Israel

[22] Filed: Dec. 7, 1970

[21] Appl. No.: 95,722

[30] Foreign Application Priority Data

Dec. 19, 1969  Israel ..................................... 33568
Oct. 26, 1970  Israel ..................................... 35538

[52] U.S. Cl. ............................... 331/94.5, 330/4.3
[51] Int. Cl. ............................................. H01s 3/02
[58] Field of Search ................... 331/94.5; 330/4.3

[56] References Cited

UNITED STATES PATENTS

| | | | |
|---|---|---|---|
| 3,394,320 | 7/1968 | Medicus | 331/94.5 |
| 3,452,295 | 6/1969 | Sher | 331/94.5 |
| 3,458,830 | 7/1969 | Geller et al. | 331/94.5 |
| 3,460,053 | 8/1969 | Leonard | 331/94.5 |
| 3,501,714 | 3/1970 | Myers et al. | 331/94.5 |
| 3,582,817 | 6/1971 | Gilson | 331/94.5 |
| 3,531,734 | 9/1970 | Gordon | 331/94.5 |

*Primary Examiner*—William L. Sikes
*Attorney*—Benjamin J. Barish

[57] ABSTRACT

Gas lasers are described in which the tube is of metal. In one embodiment, the tube is of metal for substantially the complete axial length thereof between the electrodes, the tube being insulated from and at a floating electrical potential with respect to the electrodes. In a second described embodiment, the tube is made of a plurality of metal sections each being of optimum length to provide optimum electron temperature for maximum power output and being insulated from the other sections and from the electrodes.

9 Claims, 4 Drawing Figures

PATENTED JAN 23 1973

INVENTOR
PINCHAS AVIVI
FELIX DOTHAN

BY
ATTORNEY

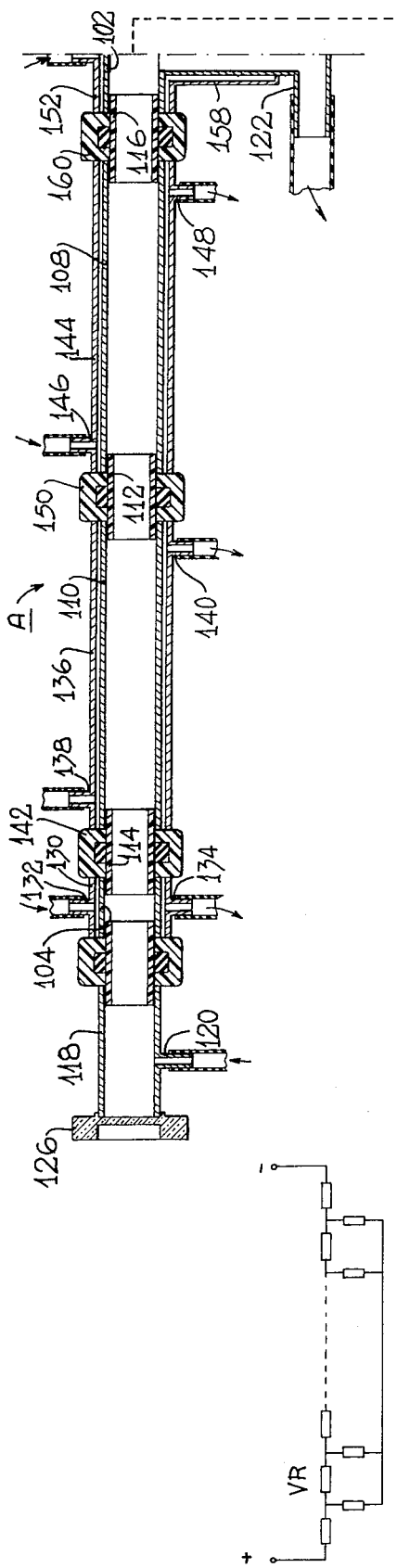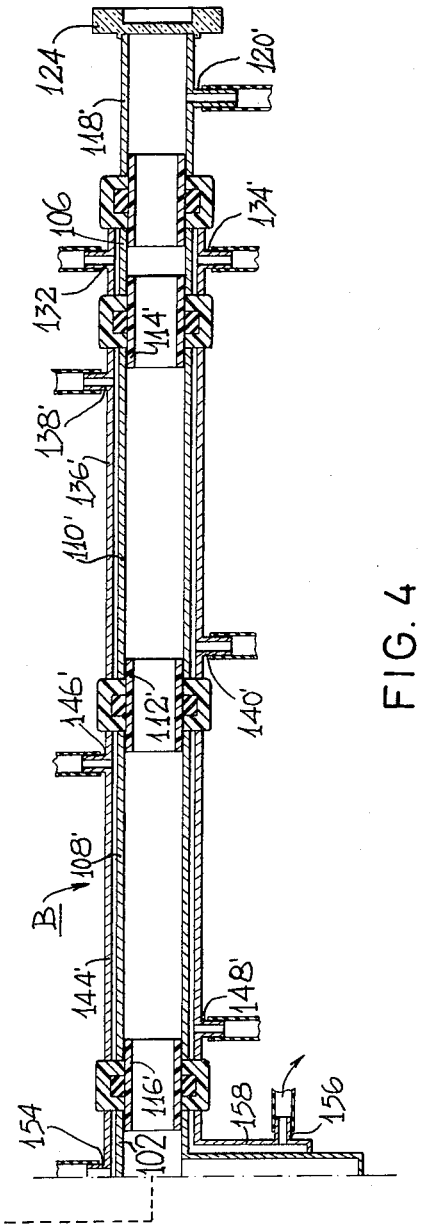
FIG. 3
FIG. 4
INVENTOR
PINCHAS AVIVI
FELIX DOTHAN

GAS LASERS WITH ELECTRICALLY-CONDUCTIVE PLASMA TUBE

The present invention relates to gas lasers, i.e., lasers in which the active medium is a gas. The invention is herein described with respect to carbon dioxide ($CO_2$) lasers, but it will be appreciated that it could also be used in other gas lasers.

Briefly, a gas laser includes a gas-filled tube forming an optical cavity, and at least two electrodes within the tube for producing an electrical discharge. In the case of oscillators, the tube is closed at one end by a totally reflecting mirror, and at the opposite end by a partially reflecting mirror, the latter being the output end through which the laser beam exits. In the case of amplifiers, the mirrors are replaced by windows through which the laser beam to be amplified enters and exits. The laser medium is the gas within the tube which may consist of atoms, metallic vapor or molecules. In the carbon dioxide laser, the gas is mostly of helium with small amounts of carbon dioxide and nitrogen. The electrical discharge within the tube provides energetic electrons which collide with the active gas particles, exciting them to higher energy levels. This produces the necessary "population inversion" required for laser action, the depopulation thereof producing the laser action.

Lasers in general, and carbon dioxide lasers in particular, are now well described in the literature (see for example the article "High-Power Carbon Dioxide Lasers", by C.K.N.Patel, *Scientific American*, 1968 Pages 23–33), and therefore further details concerning the construction and operation of such devices are readily available.

In the conventional gas laser, the tube is constructed of insulating material, e.g., glass or quartz. Such constructions are usually characterized by a requirement for high voltage between the electrodes, poor cooling, large manufacturing costs, and/or high susceptibility to breakage.

There is also known a type of laser called "small-bore ion laser", made of many sections of electrically-conductive material separated by insulating spacers. Such a construction, provided mainly to increasing cooling, still has the basic characteristics of an insulating tube laser, with many of the above-mentioned disadvantages. This type of laser is exemplified by U.S. Pat. No. 3,531,734 to E.I.Gordon et al. and is discussed more fully below.

According to one aspect of the present invention, the plasma tube of the laser, including its inner surface in contact with the confined gas, is electrically-conductive transversely and axially thereof continuously for substantially its complete axial length between the electrodes, the tube being insulated from the electrodes. The electrically-conductive tube is preferably of metal such as copper.

It was surprisingly found that a successfully operating laser could be constructed including an electrically-conducting tube as set forth above. This is because it was commonly believed that a stable gas discharge, such as involved here, could not be effected in an electrically conducting tube whose length is considerably larger than its diameter, although it has been shown that a stable electrical arc can be maintained in a tube the walls of which are made of alternating thin metal and non-conductive materials. We have found, however, that an electrically-excited laser action can be effected in an electrically-conducting tube and that a successfully operating laser can be constructed using such a tube.

A number of important advantages are provided by such a construction.

The mechanism of conduction of electricity through a gas in an electrically conducting tube is different from that in an insulating tube. In the electrically-conducting tube used in the laser of the present invention, a much lower discharge voltage is required than in the conventional insulating laser tube. For example, in the embodiment described below with respect to FIG. 1, a voltage of about 8,000 volt/meter is required in the conventional insulating tube, whereas as little as about 800 volt/meter is required when using an electrically conducting tube. (In the laser of FIG. 1, the voltage was 850 volt for 0.5 meter distance between the electrodes.) This difference in the required voltage is because the insulating wall in the conventional laser acts only as a carrier of a negative surface charge, whereas the electrically conducting wall in our novel construction influences the discharge through its potential, by absorbing positive ions from the discharge plasma and electrons from the cathode, and by emitting electrons by various secondary mechanisms.

In our construction the potential of the tube wall with respect to the plasma becomes more negative towards the anode. Both an axial and radial current in the discharge is maintained as well as a current in the tube wall which varies along the tube.

Also described herein is a second embodiment which enables the laser to produce a substantially higher power output while still retaining the basic advantages and characteristics of an electrically-conductive or metal tube laser. The following will be helpful in understanding this embodiment.

As well known, there is an optimum electron temperature for the excitation of the upper laser level in gas lasers. The electron temperature is a nearly linear function of the ratio $E/p$, where $E$ is the electrical field per unit length, and $p$ is the pressure of the gas in the laser.

In an insulating tube laser, the power output can be increased by increasing its length, since this increases the volume and the number of active molecules of the gas. The optimum electron temperature is maintained by increasing the total voltage of the tube (maintaining the optimum $E$). The voltage gradient in the operative part of the discharge remains the same.

In a laser of the type of the present invention, wherein the tube wall is electrically-conductive, the total power output cannot be increased by merely increasing the length of the tube as in an insulating tube. Rather, there exists an optimum tube length. The reasons for this are as follows:

The discharge plasma and the metal tube can be regarded as a transmission line with distributed constants (see FIG. 3), where the impedances are non-linear in such a way that the voltage $V_R$ on each of the elements if $R_R = K_o I^n$ with $n \approx o$. This electrical property of the glow discharge plasma is well known and has been exploited, for instance in the stabilization of voltage by means of glow discharge tubes. It can readily be seen that the addition or subtraction of additional impedance elements at the center of the transmission line will result in only slight changes in the total impedance, whose value is largely dictated by the impedances of the elements nearest the ends. The experimental result, that there is practically no change in the discharge voltage when the length of the tube is altered, can now be explained with the help of the equivalent circuit, i.e., on the basis of the constant impedance.

With a constant discharge voltage for different tube lengths the axial field strength will be low for a long discharge tube and high for a short discharge tube.

As indicated before, an optimum electron temperature for the excitation of the upper laser level is obtained at a certain ratio $E/p$ (electrical field strength / gas pressure). Therefore, if one wants to optimize the electron temperature in a long metal discharge tube (low E) it is necessary to operate at low gas pressures. A lower gas pressure unfortunately means a smaller member of $CO_2$ molecules. Therefore, in a metal tube laser the output power cannot be increased by simply lengthening the discharge tube, as it can in gas lasers having walls of insulating material.

The situation in a metal tube laser can be re-stated as follows. The length of the conducting tube does not affect its impedance, or the voltage drop across it. But it does affect the electrical field strength E which is thus (approximately) inversely proportional to tube length. Optimal power is thus found for a given tube length at optimal $E/p$, by adjusting the gas pressure. In a long tube this optimum pressure is lower than in a short tube. Now, the higher the pressure the more $CO_2$ is present, and thus the more laser power is possible. But at very high pressures (too short tubes) the discharge is unstable and cannot be maintained.

There thus exists, and we have shown this experimentally, an optimum tube length for each tube diameter. At this optimum tube length an $E/p$ ratio is obtained which permits optimum power, and it is obtained at a pressure high enough to involve a large quantity of $CO_2$ molecules, but not so high as to give rise to instability of the electrical discharge.

The optimum tube length can be determined experimentally, for any particular combination of tube parameters by constructing such a tube of various lengths and determining the length (as compared to the bore diameter) where the power output is maximum. As an example, this optimum length was found to be 175 mm. for a 29 mm. bore tube in the $CO_2$-laser described in FIG. 4 below.

In view of the above, we found that the output power of the metal-tube laser can be increased by connecting two or more discharge tubes of suitable length in series. This conforms to the interruption of the infinite-conductivity (tube-wall) line in the equivalent circuit. The effective impedance of the circuit can thus be increased by a factor approximately equal to the number of sections. Each discharge tube section has the same characteristics as a single discharge tube. The output power in a multiple-section metal-tube laser is therefore approximately equal to the power of a single section multiplied by the number of sections.

According to a further aspect of the invention, therefore, the plasma tube of the laser is constituted of a plurality of tubular metal sections which are electrically-conductive in the transverse and axial directions including along their inner surfaces in contact with the gas. Each section has an optimum length to provide optimum electron temperature for maximum power output. Insulating spacers are provided for insulating the sections from each other and from the electrodes, the insulating spacers being sealed to the metal sections and electrodes to confine the gas therewithin.

In a $CO_2$-laser having the parameters described herein for purposes of example, particularly good results have been produced when the tube wall has an internal bore diameter of at least 10 mm, and when each of the electrically-conductive sections has a length (the optimum length) of from five to eight times the internal bore diameter. In the specific embodiment mentioned above and described more fully below in FIG. 4, the optimum length for each section was found by experiment to be 175 mm with a bore of 29 mm, i.e., about 6 times the bore diameter. The tube constructed in accordance with this specific embodiment had two symmetrical arms and two metal sections in each arm, producing a power output of 35 watts in each arm. When an additional section was added to each arm, making it a three-section tube, a power output of 50 watts was produced in each arm. The power output could be further increased by merely adding additional mutually-insulated metal sections each of an optimum length as described herein.

We briefly referred above to small bore ion lasers of the type made up of many sections of electrically-conductive material separated by insulating spacers as exemplified by the above-mentioned U.S. Pat. No. 3,531,734. The present invention is to be distinguished from such small-bore ion laser construction, in a number of respects.

First, the bore of such ion lasers is usually very small, in the order of 1–2 mm, whereas the bore of the lasers in the present invention is a much larger order of diameter, being at least 10 mm. In the described example it is 29 mm.

Secondly, the tube wall of the small-bore ion lasers, being made of a large number of thin insulating discs alternating with conducting discs, has the basic characteristics of an insulating tube wall, in that each of the electrically-conductive discs is at a higher potential than the previous one, so that the potential gradient along the length of the inside surface of the tube basically corresponds to that along the inside surface of an insulating tube wall. Actually, the purpose of the electrically-conductive discs in the small-bore ion laser is merely to provide thermal conductivity in a radial direction, to improve the heat transfer from the tube, while retaining the differential potential along the tube wall as in the case of an insulating tube. In the laser of the present invention, however, the overall characteristics of the tube wall basically correspond to those of a metal wall rather than an insulating wall. It has the basic advantages of a metal wall construction, with the further advantage that the power output can be increased by merely adding additional metal wall sections each of an optimum length as described herein.

The invention is more particularly herein described, by way of example only, with reference to the accompanying drawings wherein:

FIG. 3 is an equivalent circuit of a transmission line with distributed constants, and has already been referred to in the above introductory description; and FIG. 4 illustrates, in longitudinal section, a further embodiment of the invention.

Figure 1:
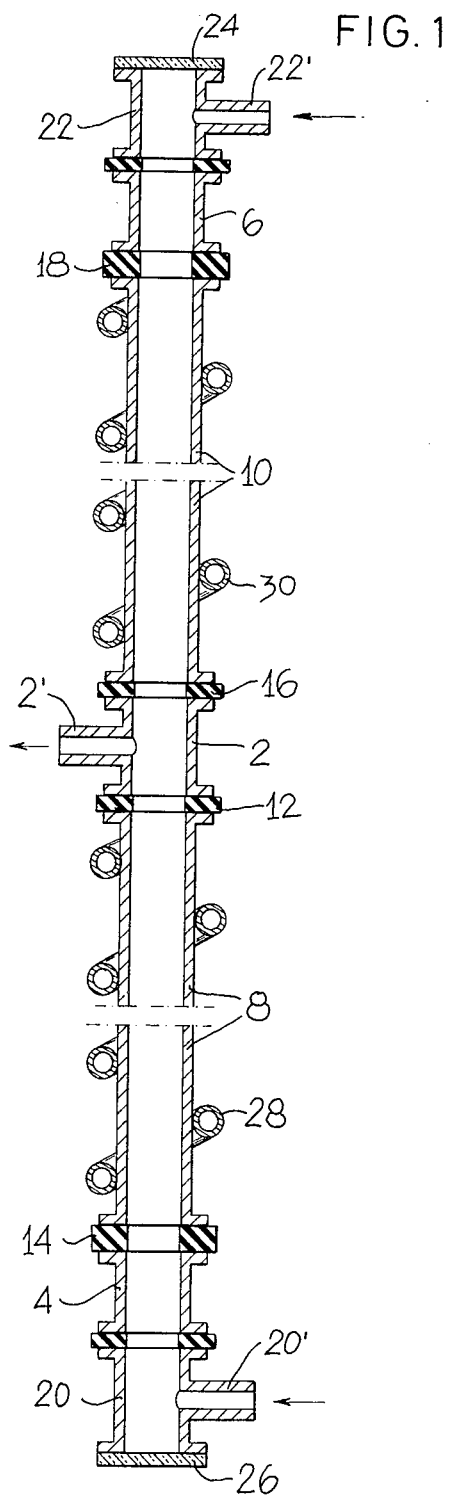
FIG. 1 is a longitudinal section view of one form of gas laser constructed in accordance with the present invention.

The gas laser illustrated in FIG. 1 is of the twin-tube type including two symmetrical arms having a common cathode 2 and two separate anodes 4 and 6. Each of these electrodes is made of a short tubular piece of metal. A metal tube 8 is located between cathode 2, and a second metal tube 10 is located between the cathode and anode 6. A pair of insulating spacers 12 and 14, e.g., of nylon, separate tube 8 from cathode 2 and anode 4, and a second pair of insulating spacers 16 and 18 separate tube 10 from the cathode and anode 6. The electrodes 2,4 and 6 are thus annular in shape and coaxial with tubes 8 and 10. The insulating spacers 12, 14, 16 and 18 between each electrode and its respective tube are also annular and coaxial with the tubes.

Two end pieces 20 and 22 of metal tubing are provided with connections 20' and 22', respectively, for the admission of the gas. Cathode 2 is provided with a connection 2' for removal of the gas. The laser cavity is terminated at one end by rear mirror 24 which is completely reflecting, and at the other end by output mirror 26 which is partially reflecting.

It will be appreciated that instead of two sections, the lasers could be constructed with only one section, i.e., only with two electrodes e.g., 2 and 4) and one metal tube e.g., 8), or with more sections. In any case the tube of FIG. 1 (as distinguished from that of FIG. 4) would be electrically conducting for substantially its complete axial length between electrodes, but of course insulated from the electrodes and at a floating electrical potential with respect to them.

The laser may be cooled by water circulated through cooling jackets 28 and 30 in the form of further metal tubes soldered directly to tubes 8 and 10. If desired, the cathode 2, the anodes 4 and 6, and the end pieces 20 and 22 may also be provided with cooling jackets.

The embodiment of FIG. 1 was constructed with all the metal parts 2, 4, 6, 8, 10, 20 and 22 made of the same 38 mm inner diameter copper tubing. Cooling jackets 28 and 30 were of 8 mm diameter copper tubing. The gas used was a mixture of carbon dioxide and helium, and the partial pressures were 1.5 torr helium (one torr equals 1 mm. of mercury), and 0.5 torr carbon dioxide. A vacuum pump having a speed of 50 lit/min was connected to cathode 2. Each half of the discharge (i.e., between electrodes 2,4, and 2,6 respectively) was operated at 850 volts and 200 mA. The reflecting mirror 24 consisted of a film of gold evaporated on a concave glass substrate having a radius of curvature of 1.5 meters. The laser beam emerged through a 3 mm. diameter hole in gold output mirror 26, the hole being covered with a NaCl window.

Laser action was achieved without difficulty, and the system operated continuously for many hours, producing a power output of from 2 up to 10 Watts.

Since the cooling jackets 28 and 30 are disposed around and in contact with the metal tubular parts of the laser, there is a very efficient cooling of the laser tube during operation.

Figure 2:
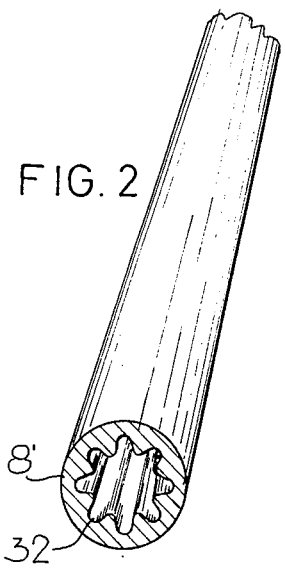
FIG. 2 is a fragmentary perspective view, in transverse section, illustrating a modification in the gas laser embodiment of FIG. 1.

Another way of cooling the laser is by the provision of cooling ribs internally of the metal tubes 8 and 10. This is shown in FIG. 2 wherein it is seen that metal tube 8' is formed with internal ribs 32 extending axially thereof. The electrodes could also be formed with the internal ribs. As pointed out above, the cooling surface is thus increased and the distance for heat conduction decreased, thereby improving the heat removal from the gas within the tube.

A further advantage of the metal tube laser described is that it may be modulated in a simple manner, enabling it to be used for the transmission of speech or other information. As mentioned earlier, the metal tube potential assumes a defined value during a stationary discharge. On the other hand, relatively small impressed changes of the wall potential produce large changes in the discharge, which in turn influence the lasing action. In this, the metal tube discharge is similar to the well known vacuum triode, where a small change of the grid potential produces a large change of anode current.

As an example, the wall potential of the described metal tube laser was modulated by speech via a microphone and an audio amplifier. As a consequence, the laser beam was amplitude-modulated with a high degree of modulation. A pyroelectric detector intercepted the laser beam, and the audio signal was fed through an amplifier to a loud speaker.

The modulating audio signal may be applied between the cathode and the metal tube wall, between the anode and the metal tube wall, or between the cathode and the anode. Audio signals of up to 50 volts were applied, and over 50 percent modulation was produced.

The advantages of being able to modulate a laser beam in this manner over the known more complicated techniques (E.g., using electrooptic crystals) will of course be apparent, and include extreme simplicity and the use of readily available, non-expensive components.

The gas laser illustrated on FIG. 4 is also of the twin-tube type including two symmetrical arms A and B, having a common cathode 102 and two separate anodes 104 and 106. Each of these electrodes is made of a short tubular piece of metal. The tube wall between cathode 102 and anode 104 of arm A is constituted of two electrically-conductive sections in the form of metal tubes 108 and 110 separated by an insulating spacer 112. Section 110 is insulated from anode 104 by a tubular insulating spacer 114, and section 108 is insulated from cathode 102 by an insulating spacer 116. The second arm B of the tube, between cathode 102 and anode 106 is of similar construction, including two metal sections 108' and 110', and insulating spacers 112', 114' and 116'.

It will be seen that the electrodes, the metal sections of the tube wall, and the insulating spacers, are all annular in shape and coaxial.

Two end pieces 118 and 118', also of metal tubing, are provided with connections 120 and 120' for the admission of the laser gas, therebeing a further connection 122 in the cathode 102 for the removal of the gas.

The laser cavity is terminated at one end by rear mirror 124 which is completely reflecting, and at the opposite end by output mirror 126 which is partially reflecting.

In arm A, a watercooling jacket 130 surrounds anode 104 and includes an inlet 132 and an outlet 134. A second water jacket 136, including inlet 138 and outlet 140, surrounds metal wall section 110, jacket 136 being separated from jacket 130 by means of an insulating sealed coupling 142. Another water jacket 144, including inlet 146 and outlet 148, surrounds metal wall section 108 and is separated from jacket 136 by means of an insulated sealed coupling 150.

Cathode 102 is surrounded by a further water jacket 152 including an inlet 154 and an outlet 156, the latter being formed in a sleeve 158 through which passes the gas outlet 122. Cathode jacket 152 is separated from jacket 154 by means of an insulated sealed coupling 160.

The other half (arm B) of the tube is constructed in the same manner as arm A, and similar parts are identified by the same reference numerals with the addition of a prime.

The laser illustrated in FIG. 4 was constructed with all the metal tubular parts all made of copper tubing of 29 mm inner diameter. The length of each of the metal wall sections was 175 mm; the length of the two anodes 104 and 106 was 35 mm; and the length of cathode 102 was 75 mm. The spacing between metal wall sections was 29 mm, as was the spacing between the respective metal wall section and its anode and cathode. The length of the end metal pieces 118 and 118' was 70 mm.

The gas was the conventional one for $CO_2$-lasers, namely a mixture of carbon dioxide, nitrogen and helium and the total gas pressure was 7 Torr. A vacuum pump having a pump capacity of 180 lit/min was connected to outlet 122. The tube was operated at an overall voltage 1,800 volts and 150 mA, each side. The water inlets were connected to a tap water supply at 20°C.

The output power produced in each of the tube was 35 watts.

In the laser having the parameters as described above, the optimum length of the metal wall sections (108, 110, 108', 110') was found to be 175 mm, or about six times the internal bore diameter (29 mm). This was found experimentally by constructing the tube and varying the length of the metal wall sections while plotting the laser power output. The maximum output from each section was produced when the length of the metal wall section was from five to eight times the internal bore diameter, the peak being at about six times the internal bore diameter.

This optimum length may be similarly determined experimentally for each combination of tube parameters in any particular design.

It will be appreciated that instead of two symmetrical arms, the laser could be constructed with only one arm, i.e. only with one anode and one cathode. Also, whereas each arm includes two mutually-insulated metal wall sections it will be appreciated that it could have only one metal wall section in each arm, or more than two metal wall sections in each arm.

Thus, when each arm of the tube of FIG. 4 included only one metal wall section (108 or 110) of the same construction and dimensions, an output power of 18 watts was produced in each arm. When each arm of the tube of FIG. 1 included three metal wall sections of the same construction and dimensions, but mutually insulated from each other and from the electrodes, an output power of 50 watts was produced in each arm.

While the invention has been described above with respect to $CO_2$-lasers, it will be appreciated it could be used with other known gas lasers.

The illustrated embodiments are described for purposes of example, and many other variations, modifications and applications, in addition to those briefly mentioned above, will be apparent.

What is claimed is:

1. A laser including a plasma tube confining therewithin a quantity of a gas capable of population inversion in an ionized condition, and at least two spaced electrodes producing an electrically-excited laser action within the tube, characterized in that said plasma tube, including its inner surface in contact with the confined gas, is electrically-conductive transversely and axially thereof continuously for substantially its complete axial length between said electrodes, said tube being insulated from said electrodes.

2. A laser according to claim 1, further characterized in that said electrically-conductive tube is a metal tube.

3. A laser according to claim 2, further characterized in that said electrodes are annular in shape and are of the same diameter as and coaxial with said electrically-conductive tube, there being a coaxial, annular insulating spacer between each electrode and the electrically-conductive tube.

4. A laser according to claim 3, further characterized in that there are two anodes, one disposed at each end of said tube, and a cathode disposed therebetween.

5. A laser according to claim 1, further characterized in that it includes a cooling jacket disposed around and in contact with said electrically-conductive tube.

6. A laser according to claim 1, further characterized in that said electrically-conductive tube is provided with internal cooling ribs.

7. A laser comprising a plasma tube containing a gas and at least two spaced electrodes for producing an electrically-excited laser action within the tube, characterized in that said plasma tube is constituted of a plurality of tubular metal sections which are electrically-conductive in the transverse and axial direction including along their inner surfaces in contact with the gas, said sections having an internal bore diameter of at least 10 mm and each being of an optimum length to provide optimum electron temperature for maximum power output, and insulating spacers insulating said sections from each other and from said electrodes, said insulating spacers being sealed to said metal sections and electrodes to confine the gas therewithin.

8. A laser according to claim 7, further characterized in that each of said electrically-conductive sections has a length of five to eight times said internal bore diameter.

9. A laser comprising a plasma tube confining therewithin a quantity of a gas which is capable of population inversion in an ionized condition, and at least two spaced electrodes producing an electrically-excited laser action within the tube, characterized in that said plasma tube has an internal bore diameter of at least 10 mm and is constituted of at least one metal section electrically conductive transversely and axially thereof, including along its inner face in contact with the confined gas, and has a length of five to eight times said internal bore diameter, said electrically-conductive section being insulated from said electrodes.

* * * * *